United States Patent
Gould et al.

(10) Patent No.: US 11,475,023 B2
(45) Date of Patent: Oct. 18, 2022

(54) IMPACT ANALYSIS

(71) Applicant: Ab Initio Technology LLC, Lexington, MA (US)

(72) Inventors: Joel Gould, Arlington, MA (US); Scott Studer, Georgetown, MA (US)

(73) Assignee: Ab Initio Technology LLC, Lexington, MA (US)

( * ) Notice: Subject to any disclaimer, the term of this patent is extended or adjusted under 35 U.S.C. 154(b) by 249 days.

(21) Appl. No.: 16/199,985

(22) Filed: Nov. 26, 2018

(65) Prior Publication Data
US 2019/0095390 A1    Mar. 28, 2019

Related U.S. Application Data

(63) Continuation of application No. 14/738,232, filed on Jun. 12, 2015, now Pat. No. 10,176,234.
(Continued)

(51) Int. Cl.
*G06F 16/2458* (2019.01)
*G06F 16/2452* (2019.01)
(Continued)

(52) U.S. Cl.
CPC .......... *G06F 16/2465* (2019.01); *G06F 16/17* (2019.01); *G06F 16/176* (2019.01); *G06F 16/2452* (2019.01)

(58) Field of Classification Search
CPC .... G06F 16/2465; G06F 16/17; G06F 16/176; G06F 16/2452
(Continued)

(56) References Cited

U.S. PATENT DOCUMENTS 5,966,072 A    10/1999  Stanfill et al.
6,047,247 A *   4/2000  Iwanishi ............... G06F 11/008
                                                         702/117
(Continued)

FOREIGN PATENT DOCUMENTS

CN    101727320    6/2010
CN      1713179    9/2010
(Continued)

OTHER PUBLICATIONS

JP Office Action in Japanese Appln. No. 2017-520918, dated Jun. 2, 2020, 13 pages (with English translation).
(Continued)

*Primary Examiner* — Phong H Nguyen
(74) *Attorney, Agent, or Firm* — Fish & Richardson P.C.

(57) ABSTRACT

Methods, systems, and apparatus, including computer programs encoded on computer storage media, for impact analysis. One of the methods includes receiving information about at least two logical datasets, the information identifying, for each logical dataset, a field in that logical dataset and format information about that field. The method includes receiving information about a transformation identifying a first logical dataset from which the transformation is to receive data and a second logical dataset to which the transformed data is provided. The method includes receiving one or more proposed changes to at least one of the fields. The method includes analyzing the proposed changes based on information about the transformation and information about the first logical dataset and the second logical dataset. The method includes calculating metrics of the proposed change based on the analysis. The method also includes storing information about the metrics.

23 Claims, 7 Drawing Sheets

Related U.S. Application Data

(60) Provisional application No. 62/075,558, filed on Nov. 5, 2014.

(51) Int. Cl.
*G06F 16/17* (2019.01)
*G06F 16/176* (2019.01)

(58) Field of Classification Search
USPC .................................................. 707/602, 756
See application file for complete search history.

(56) References Cited

U.S. PATENT DOCUMENTS

| | | | |
|---|---|---|---|
| 7,313,531 B2* | 12/2007 | Chappel | G06Q 10/06 705/7.17 |
| 7,373,615 B2* | 5/2008 | Dougherty, Jr. | G06F 30/327 716/104 |
| 8,775,447 B2* | 7/2014 | Roberts | G06F 16/2365 707/756 |
| 10,176,234 B2 | 1/2019 | Gould et al. | |
| 2003/0101089 A1* | 5/2003 | Chappel | G06Q 10/06313 705/7.17 |
| 2005/0183046 A1* | 8/2005 | Dougherty | G06F 30/327 716/104 |
| 2006/0294150 A1* | 12/2006 | Stanfill | G06F 16/21 707/999.2 |
| 2007/0051668 A1 | 3/2007 | Watanabe et al. | |
| 2008/0256014 A1* | 10/2008 | Gould | G06N 5/04 706/47 |
| 2009/0327196 A1* | 12/2009 | Studer | G06F 21/552 706/47 |
| 2010/0122240 A1 | 1/2010 | Matsuo | |
| 2010/0114962 A1 | 5/2010 | Ahadian | |
| 2010/0138420 A1 | 6/2010 | Bator et al. | |
| 2010/0198769 A1* | 8/2010 | Gould | G06N 5/025 706/47 |
| 2011/0066602 A1* | 3/2011 | Studer | G06F 16/284 707/690 |
| 2011/0313979 A1* | 12/2011 | Roberts | G06F 16/24565 707/690 |
| 2012/0179647 A1* | 7/2012 | Crucs | G06F 40/197 707/608 |
| 2012/0185449 A1 | 7/2012 | Gould et al. | |
| 2013/0152042 A1* | 6/2013 | Bennett | G06F 8/70 717/110 |
| 2013/0346157 A1 | 12/2013 | Acrilionis et al. | |
| 2015/0213366 A1 | 7/2015 | Gould | |
| 2016/0125057 A1 | 5/2016 | Gould | |
| 2016/0210421 A1* | 7/2016 | Matsumasa | G16H 40/20 |

FOREIGN PATENT DOCUMENTS

| | | |
|---|---|---|
| CN | 103178982 | 6/2013 |
| CN | 102637208 | 10/2013 |
| CN | 104123352 | 10/2014 |
| CN | 103348598 | 7/2017 |
| JP | H06-175858 | 6/1994 |
| JP | H06-290039 | 10/1994 |
| JP | H09-101880 | 4/1997 |
| JP | 2000-339145 | 12/2000 |
| JP | 2007-128123 | 5/2007 |
| JP | 2009-157505 | 7/2009 |
| JP | 2008544423 | 12/2009 |
| JP | 2010015458 | 1/2010 |
| JP | 2010524134 | 7/2010 |
| JP | 2012210688 | 11/2012 |
| JP | 2014507713 | 3/2014 |
| KR | 20110091558 | 8/2011 |
| WO | WO2009/011057 | 9/2010 |

OTHER PUBLICATIONS

JP Office Action in Japanese Appln. No. 2017-520918, dated Aug. 29, 2019, 6 pages.
CN Office Action in Chinese Appln. No. 201580072270.6, dated Feb. 25, 2020, 14 pages (With English translation).
International Search Report and Written Opinion issued in PCT/US2015/059266, dated Jan. 25, 2016 (12 pages).
International Preliminary Report on Patentability in PCT/US2015/059266, dated May 9, 2017.
CN Office Action in Chinese Appln. No. 201580072270.6, dated Mar. 26, 2021, 7 pages (With English translation).
IN Office Action in Indian Appln. No. 201717019361, dated Jan. 29, 2021, 7 pages.
JP Office Action in Japanese Appln. No. 2017-520918, dated Jan. 12, 2021, 18 pages (with English translation).
AU Office Action in Australian Appln. No. 2020210281, dated May 20, 2022, 4 pages.

* cited by examiner

300

| 302 Input | | 304 Output |
|---|---|---|
| 306 Years | 308 Income | 310 Risk |
| >15 | any | Low |
| any | >150,000 | Low |
| >10 | >60,000 | Low |
| >5 | any | Medium |
| any | >50,000 | Medium |
| >3 | >40,000 | Low |
| any | any | High |

Arrows point to rows: 312 → row 1, 314 → row 2, 316 → row 3, 318 → row 4, 320 → row 5, 322 → row 6, 324 → row 7.

FIG. 3

IMPACT ANALYSIS

CROSS-REFERENCE TO RELATED APPLICATIONS

This application is a continuation of U.S. application Ser. No. 14/738,232, filed Jun. 12, 2015, which claims priority to U.S. Provisional Application Ser. No. 62/075,558, filed on Nov. 5, 2014, entitled "IMPACT ANALYSIS," the entire contents of each of which are hereby incorporated by reference.

BACKGROUND

This description relates to system analysis.

Computers are used to process large amounts of data. In general, the data is processed using computer programs what are written, at least in part, by computer programmers. These data processing systems can be complex.

Business and technical requirements can require that programs change. Implementing a change requires the allocation of personnel to make the change.

SUMMARY

In general, according to aspect 1, a method includes the actions of receiving information about at least two logical datasets, the logical dataset information identifying, for each logical dataset, an identifier for at least one field in that logical dataset, and format information about that field. The method includes the actions of receiving information about a transformation, the information identifying a first logical dataset describing characteristics of a first physical dataset from which the transformation is to receive data and a second logical data describing characteristics of a second physical dataset to which the transformed data is to be provided. The method includes the actions of receiving one or more proposed changes to at least one of the fields of a logical dataset. The method includes the actions of analyzing the one or more proposed changes based on information about the transformation and information about the first logical dataset and the second logical dataset. The method includes the actions of calculating one or more metrics of the proposed change based on the analysis. The method includes the actions of storing information about the one or more metrics.

Other embodiments of this aspect include corresponding computer systems, apparatus, and computer programs recorded on one or more computer storage devices, each configured to perform the action of the methods. A system of one or more computers can be configured to perform particular actions by virtue of having software, firmware, hardware, or a combination of them installed on the system that in operation causes the system to perform the actions. One or more computer programs can be configured to perform particular actions by virtue of including instructions that, when executed by data processing apparatus, cause the apparatus to perform the actions.

The methods include an aspect 2 according to aspect 1 wherein the calculated metric provides a measure of direct impact. The methods include an aspect 3 according to aspects 1 or 2 wherein the calculated metric provides a measure an indirect impact. The methods include an aspect 4 according to aspects 1, 2, or 3 wherein the proposed change is one of the group consisting of a change in format of a field in a dataset or a change in a transformation. The methods include an aspect 5 according to aspects 1, 2, 3, or 4 wherein the transformation includes one or more rules to be applied to data from the first logical dataset, and wherein analyzing the one or more proposed changes is further based on the one or more rules. The methods include an aspect 6 according to aspects 1, 2, 3, 4, or 5, wherein the method further includes the actions of Other embodiments of this aspect include associating a cost to the proposed change based on the metric.

Aspects can include one or more of the following advantages. The scope and cost of making a change can be estimated. Locations where a change will affect a program can be identified. Resources can be appropriately allocated.

Other features and advantages of the invention will become apparent from the following description, and from the claims.

DESCRIPTION OF DRAWINGS

FIG. 3 illustrates an example of a human readable rule set.

DESCRIPTION

Generally, data processing systems can read data from a source, perform operations on the data to produce new data, and store the new data in a data store. Data processing systems range in complexity from trivial to extremely complex. In more complex systems, changes made to a data processing system can have wide ranging effects that can be difficult to determine. In order to determine the impact of making a change to a system, it is helpful to determine the parts in the system that are directly affected by the change, and the parts in the system that are indirectly affected by the change. In general, parts in the system that are directly affected by the change may require an individual to manually adjust the system. For example, a programmer may be required to change the contents and behavior of an application. In general, parts of the system that are indirectly affected by the change may require that those parts be tested to ensure that the changes made by the programmer have not adversely affected the behavior of the application.

In a complex system, it can be difficult to determine the scope of a proposed change. Some changes may be cost prohibitive, while other changes may be relatively inexpensive. In a complex system, it is frequently difficult to tell the difference between a cost prohibitive change and a relatively inexpensive one. Some changes may be necessary to increase the quality of the process; however, it is still necessary to be able to estimate the scope of the work that must be undertaken to implement the change. Further, it's important to provide consistent, reproducible, and predictable quotes. Further quotes provided by the system can be compared to human estimates and actual results.

In order to determine, the scope of a change, a system is analyzed. The analysis identifies how data flows through the system. The system is also analyzed to identify how a change to either the data used by the system or the processing of that data could affect other parts of the system.

Figure 1:
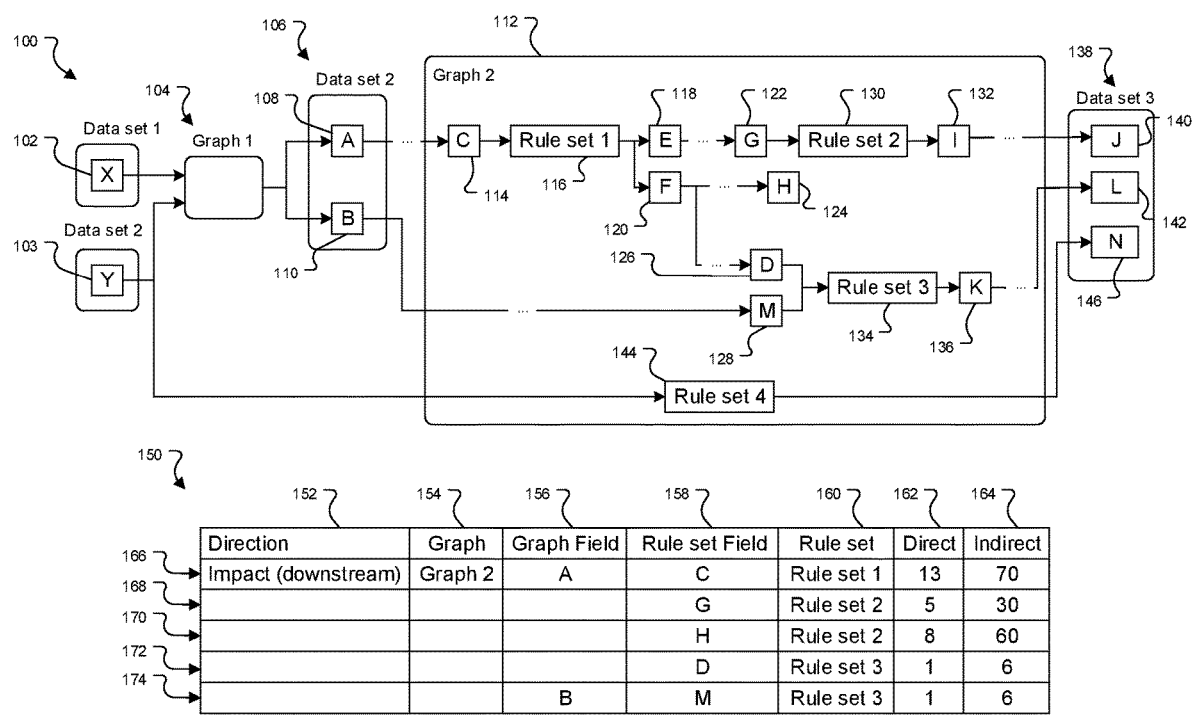
FIG. 1 illustrates an example of a data lineage for multiple executable programs.

FIG. 1 illustrates an example of a data lineage 100 for multiple components. Components can include logical datasets and transforms. A transform can be, for example, dataflow graphs, java programs, compiled executable programs, or any combination thereof. In general, a transform can accept input data and can generate output data. For example, graph 1 104 accepts input data from logical dataset 1 102 and logical dataset 2 103 and generates output data that is provided to logical dataset 2 106.

In general, a physical dataset refers to application data stored on a computer-readable medium, including but not limited to magnetic disks, flash memory, random access memory, and read only memory. The physical dataset may include unique data that can vary from day to day. In general, logical datasets is a data structure that acts as an abstraction of one or more physical datasets that store data. In some implementations, a physical datasets with different data may be stored in separate files. For example, a physical dataset of foreign exchange rate data for November 8 may be stored in a file, "ExchangeRate_11_08." The physical dataset of foreign exchange rate data for November 9 may be stored in a file, "ExchangeRate_11_09." Both the physical dataset for exchange rate data for November 8 and the physical dataset for exchange rate data for November 9 have common elements. For example, both physical datasets share a common data format. This common data format may be reflected in a logical dataset that is associated with both the "ExchangeRate_11_08" file and the "ExchangeRate_11_09" file.

In general, logical datasets include information about the attributes of the dataset that do not vary between physical dataset. For example, information about logical datasets may include field names, data types, record formats, constraints, and other features. Logical datasets can be categorized as data sources and data sinks. A single logical dataset can be a data sink for one transform and a data source for another transform. The corresponding physical datasets of a logical dataset can be, for example, a table in a relational database or a file on a file system (among other places). The data source can read the data records stored in the logical dataset and can create in-memory data records. Components accept the in-memory data records created by the data source and modify or transform the data. Data values can be changed or transformed. New data records can be created. A data sink can provide an exit point from the dataflow graph and can store output records. Like the data source, a data sink can be, for example, a relational database table or a file stored on a file system. The components can be executed on a computer or other type of computer device. In other implementations, the execution of the dataflow graph can be distributed among multiple computing devices.

In some implementations, components can accept input data, for example on input ports, and produce output data, for example on output ports. Links connect an output port of a first component to an input port of a second component. Some components can have multiple input and output ports. The sequence of components and links by which a data record can navigate from an entry point to an exit point is referred to as a path. Data lineage can be used to identify the different paths and trace the flow of data through one or more components.

In this example the data element 'x' 102 is a member of logical dataset 1. The data element 'y' 103 is a member of logical dataset 2. In general, a data element refers to individual records stored within a logical dataset. For example, a logical dataset can be a table in a relational database and a data element can be a row from that table. Data element 'x' and data element 'y' are input into graph 1 104. Graph 1 generate logical dataset 2 106. Logical dataset 2 contains data elements 'A' 108 and data element 'B' 110. These data elements are inputs into graph 2 112. Data element 'A' is used to generate data element 'C' 114. Data element 'C' is provided as an input into rule set 1 116. In general, a rule set is a collection of rules that are applied to data to generate an output. A rule set can be, for example, a series of tests and results that are applied to a value in a data element. A rule set can accept one or more inputs and based on the values of those inputs produce one or more outputs. In general, a rule set can be compiled or made into a computer executable transformation. The data lineage graph 100 shown in FIG. 1 has been simplified for explanatory purposes and space considerations. In general, the presence of an ellipsis along a line indicates that one or more components and data sources have been omitted. Data transformations may occur that are not shown. For example, data element 'A' 108 may be transformed to generate data element 'C' 114. Data element 'E' 118 may be transformed to generate data element 'G' 122, etc.

Rule set 1 generates two outputs data element 'E' 118 and data element 'F' 120. Data element 'E' 118 is used to generate data element 'G' 122. Data element 'G' is provided as input to rule set 2 130. Rule set 2 produces an output of data element 'I' 132. Data element 'I' is used to generate data element 'J' 140 of logical dataset 3 138. Data element 'F' 120 is used to generate data element 'H' 124 and data element 'D' 126. Data element 'B' 110 is used to generate data element 'M' 128. Data element 'M' 128 and data element 'D' 126 are provided as input to rule set 3 134. Rule set 3 generates data element 'K' 136. Data element 'K' is used to generate data element 'L' 142 of logical dataset 3 138. Data element 'Y' is provided as an input to rule set 4 144. Rule set 4 144 generates data element 'N' 146 of logical dataset 3 138.

A change made to a logical dataset or data element can affect many different rule sets and data elements. These changes can include, among other changes, a change to a schema or record format and changes to valid values for different data elements. For example, if a record schema of a data element is changed (for example, the record schema can change from a number to a string field) the change can affect each rule set that utilizes that data element and each rule set that utilizes a data element that depends on the changed data element. For example, a change made to the record format of data element C 114 could affect rule set 1 116, data element E 118, data element F 120, data element G 122, data element H 124, data element D 126, rule set 2 130, data element I 132, data element J 140, rule set 3 134, data element K 136, and data element L 142. A change made to the record format of data element X 102 could affect every other element in the data lineage (with the exception of data element Y 103, ruleset 4 144, or data element N 146).

A system can generate a report that provides information on the impact of a change to a data element or rule set. For example, the report 150 provides information on the impact of a change to data element A on graph 2.

The report 150 includes a direction column 152. Direction column 152 indicates a direction in the data lineage for which the report 150 was generated. The direction can be either upstream (referring to rule sets, logical datasets, and data elements that precede the data element in the data lineage) or downstream (referring to rule sets, logical datasets, and data elements that follow the data element in the data lineage). For example, data element C is upstream of rule set 1 and downstream of data element A.

The report 150 also includes a graph column 154. The graph column 154 identifies the graph that is the subject of a rows in the report 150. In this example, graph 2 112 is the subject of the report 150. The report 150 also includes a graph field column 156. The graph field column 156 identifies the field that is the subject of the report 150. In general, the field will be an input to the graph if the direction is downstream and an output of the graph if the direction is upstream. In this example, the data element A 108 and B 110 is the subjects of the report 150.

The report 150 also includes a rule set field column 158. The rule set field column 158 identifies data elements that are inputs (in the case of a downstream report) or outputs (in the case of an upstream report). The rule set column 160 identifies the rule set that is the subject of the row of the report 150. In this example, the report 150 provides information about data element C as an input into rule set 1 (in the first tow 166), data element G as an input into rule set 2 (in the second row 168), data element H as an input into rule set 2 (in the third row 170), data element D as an input into rule set 3 (in the fourth row 172), and data element M as an input into rule set 4 (in the fifth row 174).

The report 150 also includes a direct column 162 and an indirect column 164. The direct 162 and indirect 164 columns are determined as described further below. The direct column reports the number of times that the data element identified by the rule set field is directly referenced within the rule set. For example, the direct column 162 can include a count of the expressions that directly assign a value to the output. The indirect column 164 identifies the number of times that the data element identified by the rule set field affects the value of one or more other data elements within the rule set identified by the rule set field. For example, the indirect column 164 can display a count of the total number of rule cases or other expressions that contribute to the output value of the data element. For an output that is computed by a business rule, the expression count is the number of rule cases, including a default value if there is one. In this example, data element 'C' (row 166) is directly references 13 times in rule set 1 and affects the value of one or more other data elements 70 times.

In order to generate the report 150, a system processes a rule set to determine which data elements are relevant to the rule set. The rule set can be expressed as a set of criteria that can be used, for example, for converting data from one format to another, making determinations about data, or generating new data based on a set of input data.

Figure 2:
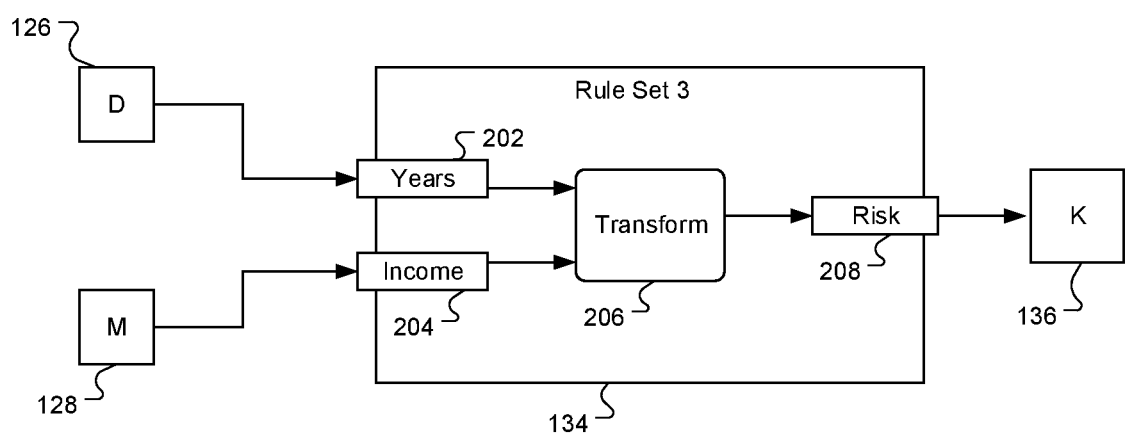
FIG. 2 illustrate an example rule set and the inputs into the rules set.

FIG. 2 illustrates an example rule set and the inputs into the rule set. As described above, rule set 3 134 has two inputs, data element 'D' 126 and data element 'M' 128. Rule set 3 134 may reference the inputs as a "Years" parameter 202 and an "Income" parameter 204. In this example, the "Years" parameter 202 and the "Income" parameter 204 are processed by a transform 206, described in more detail below. The Transform 206 produces a "Risk" output 208 which is provided as data element 'D' 136.

FIG. 3 illustrates an example of a human readable rule set 300. The human-readable rule set 300 can be defined at run time using a graphical user interface (GUI) or can be pre-defined in a flat file or other structure. The human-readable rule set 300 can be later compiled into a transform, for example, the transform 206 of FIG. 2, as described below. For example, the human-readable rule set 300 can be compiled into the rule set 3 134 of FIG. 1. For example, if the data element M 128 represented income and the data element D 126 represented years as a customer. Referring again to FIG. 3, the human-readable rule set 300 is illustrated in a tabular form. The human-readable rule set 300 presented in FIG. 3, can be used to determine a risk category 310 as an output 304 based on two inputs 302, namely, years 306 and income 308. In this example, there are seven potential conditions. A first rule 312 states if a person has been a customer for more than 15 years, the risk is low, regardless of income. A second rule 314 states that if the customer has an income in excess of $150,000 then the first is low, regardless of the number of years the person has been a customer. A third rule 316 states that if the person has been a customer for more than ten years (but less than 15) and has income of more than $60,000 then the risk is low. A fourth rule 318 states that if the person has been a customer for more than 5 years then the risk is medium regardless of income. A fifth rule 320 states that if the person has an income of greater than $50,000 then the risk is medium regardless of the amount of time the person has been a customer. A sixth rule 322 states that if the person has been a customer for more than three years and has an income of more than $40,000 then the risk is low. A seventh rule 324 is a catch all rule that states that otherwise the risk is high.

It is noted that, in this example, the rules are evaluated sequentially. Once a person qualifies for a risk category then rule processing is complete. For example, if a person has been a customer for more than 15 years, and is assigned a risk of "low" (from row 312) then the remaining rows will never execute.

In order to determine the impact of a change to one of the input or output fields, a system can perform an analysis of the rule set as described below.

To implement rule set in a graph-based computation environment, a transform is generated which receives input records from one or more data sources, e.g., data element 'C' 106, and inserts a data element into an output logical dataset, e.g. data element 'E' 118 and data element 'F' 120. Input and output logical datasets can also be referred to as data streams. As shown in FIG. 1, the transforms can then be implemented in graph-based computations having data processing components connected by linking elements representing data flows.

Figure 4:
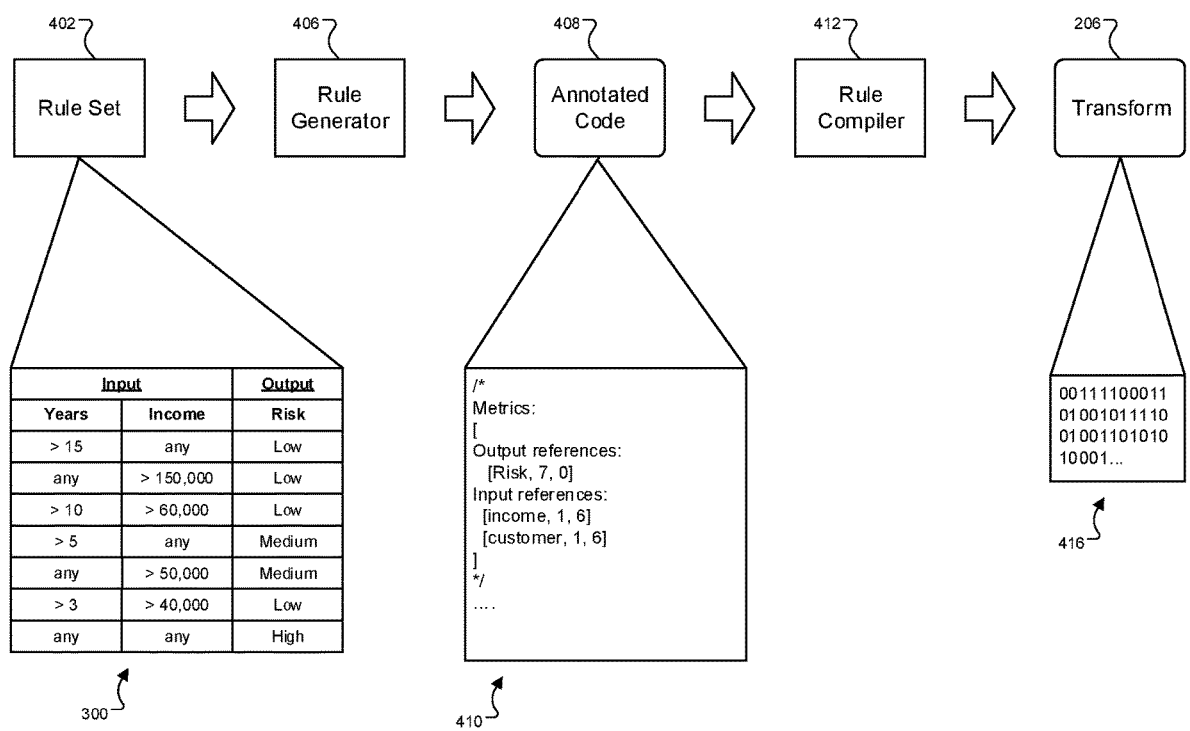
FIG. 4 illustrates a process by which a rule can be transformed from the human readable form into a transformation containing machine readable code.

FIG. 4 illustrates a process by which a human readable rule set can be transformed into a transform containing machine readable code by a data processing device. A rule set 402, for example the human-readable rule set 300 of FIG. 3, is provided to a rule generator 408. The rule generator generators the rule set 402 into an intermediate form. For example, the rule generator 406 can generate annotated code 408. The annotated code 408 can include reported metrics 410 which defines the direct and indirect impact of a change to a rule. For example, the human-readable rule set 300 can result in the generation of annotated code, such as

```
/* Default Risk Rules */
/*@
Reported Metrics:
[
Output references:
[default risk, 7, 0]
Input references:
[income, 1, 6]
[years, 1, 6]
]
@*/
if (years > 15) {
```

```
    default_risk = "Low"
} else if (income > 150000) {
    default_risk = "Low"
} else if (years > 10 && income > 60000) {
    default_risk = "Low"
} else if (years > 5) {
    default_risk = "Medium"
} else if (income > 50000) {
    default_risk = "Medium"
} else if (years > 3 && income > 40000) {
    default_risk = "Medium"
} else {
    default_risk = "High"
}
```

As discussed above, a direct impact describes the number of times that the data element identified by the rule set field is directly referenced or set within the rule set. Examples of measures of direct impact include, but are not limited to, locations in a rule set where a changed input parameter is accessed. Examples of measure of indirect impact include, but are not limited to, locations in a rule set where values are set based on a value in a changed input parameter. The indirect impact identifies the number of times that the data element identified by the rule set field affects the value of one or more other data elements within the rule set.

A rule generator 406 can generate the direct and indirect metrics in a variety of ways. For example, in some implementations, the rule generator 406 can analyze the rule set to identify each time a data element is accessed and each time another value depends on the data element. More complex scenarios can also be tracked. The rule generator 406 can track every variable that depends on the value of the input or output value regardless of how indirect. For example, if a variable affects an intermediate value and the intermediate value affects a final value, the system can record both the intermediate value and the final value as indirect effects. For example, the human readable rule set 300 has four rules that access the value of the years 306 input and four rules that access the value of the income 308 input, and seven rules that set the value of the risk 310 output. In some implementations, a rule set may be presumed to set the value for each parameter at least once. For example, the years input is set when the input value is provided to the rule set.

In some implementations, the rule generator 406 can count the number of rules in the rule set that depend, at least in part, on a parameter. For example, the human readable rule set 300 includes seven rules that depend on the years 306 input, seven rules that depend on the income 308 input, and seven rules that set the risk 310 output. As discussed above, rule 324 it a catch all rule. In some implementations, catch all rules may be ignored by the rule generator 406.

The annotated code 408 can be provided to a rule compiler 412. The rule compiler 412 can compile the annotated code 408 into the transform 206. In general, a transform is a machine (or virtual machine) executable program, for example, the executable program 416.

Referring to FIG. 4, a report generator can generate a report 408 based on annotated code 402 for a data lineage 4. For example, referring back to FIG. 1, the system can use the data lineage to determine that, for example, data element X affects the value of data elements A, B, C, D, E, F, G, H, I, J, K, L, and M. Therefore when processing graph 2, the system determines that a change to data element X implicates rule set 1, rule set 2, and rule set 3. However, data element X does not implicate rule set 4. Therefore, the report generator can determine that rule set 4 does not need to be analyzed as part of the impact analysis of a change to data element X.

Figure 5:
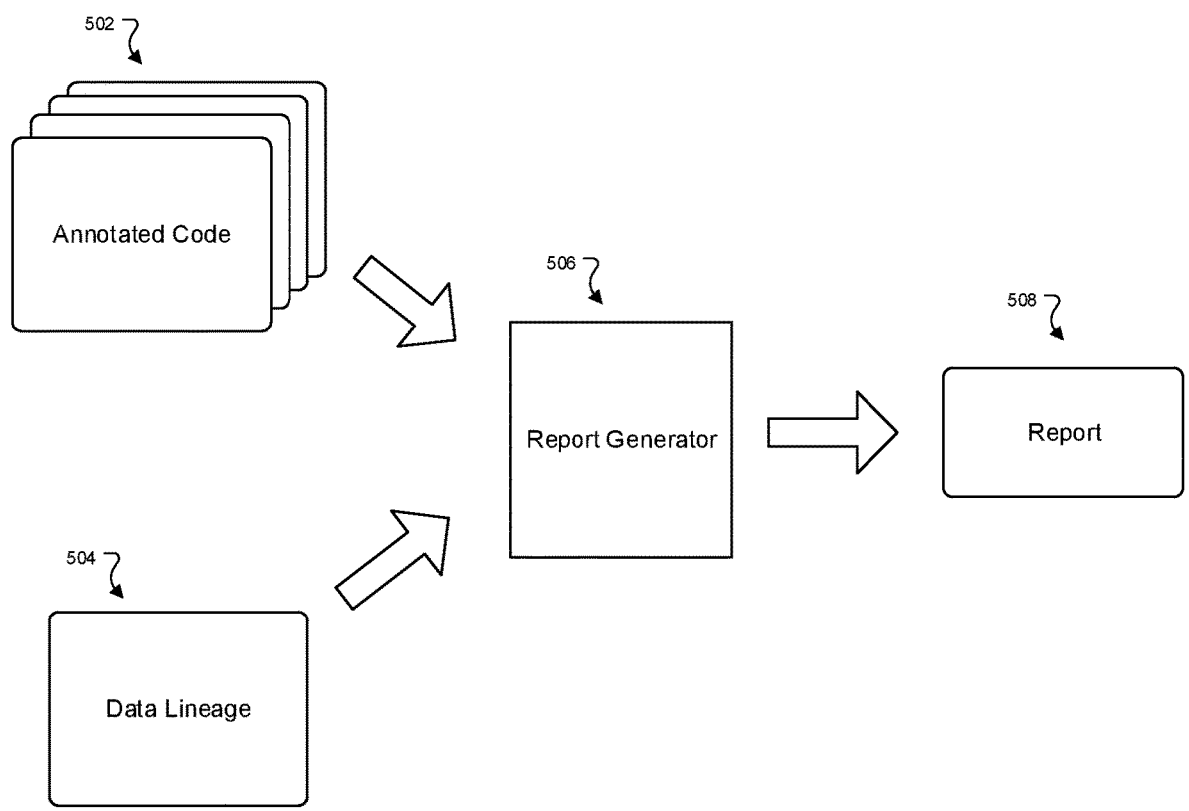
FIG. 5 illustrates a report generator generating a report based on annotated code.

FIG. 5 illustrates a report generator generates a report based on annotated code. The report generator 506 identifies which inputs would be affected by a change and records the results from the computed metrics of impact. For example, data element 'X' affects both inputs to rule set 3. Therefore, the report generator records the metrics (410 of FIG. 4) in the report (such as rows 172, 174 of FIG. 1).

In some implementation, estimated costs can be associated with each of the direct and indirect counts may be determined by a data processing system. For example, it can be estimated that a direct effect would require a predetermined amount of a programmer's time and a predetermined amount of a quality assurance person's time. Similarly, it can be estimated that an indirect effect would require a predetermined amount of a quality assurance person's time. Based on the estimated times, a tally of the direct and indirect effect, and a cost associated with a computer programmers time and a quality assurance persons time, the system can provide an estimate of the cost to make the change to the analyzed system.

In some implementations, the rule generator can be used to assist a developer in identifying different portions of a system, for example, a system represented by the data lineage 100 of FIG. 1.

Figure 6:
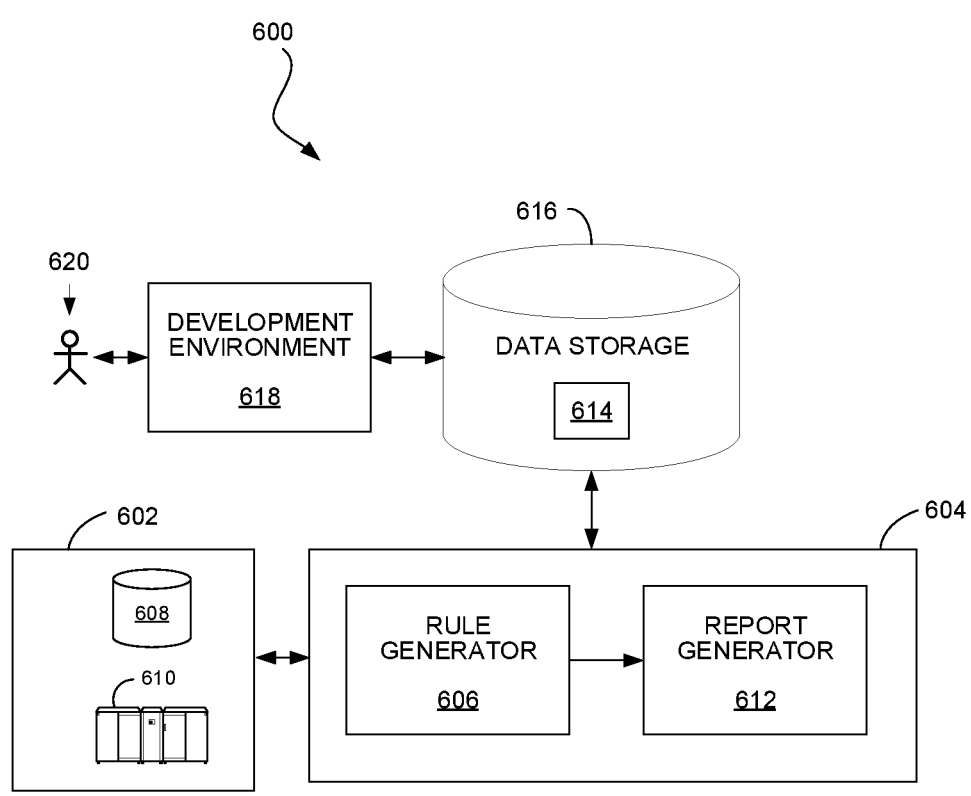
FIG. 6 shows an example of a data processing system in which the impact analysis techniques can be used.

FIG. 6 shows an example of a data processing system 600 in which the impact analysis techniques can be used. The system 600 includes a data source 602 that can include one or more sources of data such as storage devices or connections to online data streams, each of which can store or provide data in any of a variety of formats (e.g., database tables, spreadsheet files, flat text files, or a native format used by a mainframe). An execution environment 604 includes a rule generator 606 and a report generator 612. The execution environment 604 can be hosted, for example, on one or more general-purpose computers under the control of a suitable operating system, such as a version of the UNIX operating system. For example, the execution environment 604 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The rule generator module 606 reads rule set from the data source 602 and stores annotated code for the rules. Storage devices providing the data source 602 can be local to the execution environment 604, for example, being stored on a storage medium (e.g., hard drive 608) connected to a computer hosting the execution environment 604, or can be remote to the execution environment 604, for example, being hosted on a remote system (e.g., mainframe 610) in communication with a computer hosting the execution environment 604, over a remote connection (e.g., provided by a cloud computing infrastructure).

The report generator 612 uses the annotated code generated by the rule generator 606 and data lineage, which can be stored in the data source 602, to generate a report of the impact of making a change. The output data can be 614 stored back in the data source 602 or in a data storage system 616 accessible to the execution environment 604, or otherwise used. The data storage system 616 is also accessible to a development environment 618 in which a developer 620 is able to determine the effect of making a change to a data element, rule, of other programming construct. The development environment 618 is, in some implementations, a system for developing applications as dataflow graphs that include vertices (representing data processing components or logical datasets) connected by directed links (representing flows of work elements, i.e., data) between the vertices. For example, such an environment is described in more detail in U.S. Publication No. 2007/0051668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

Figure 7:
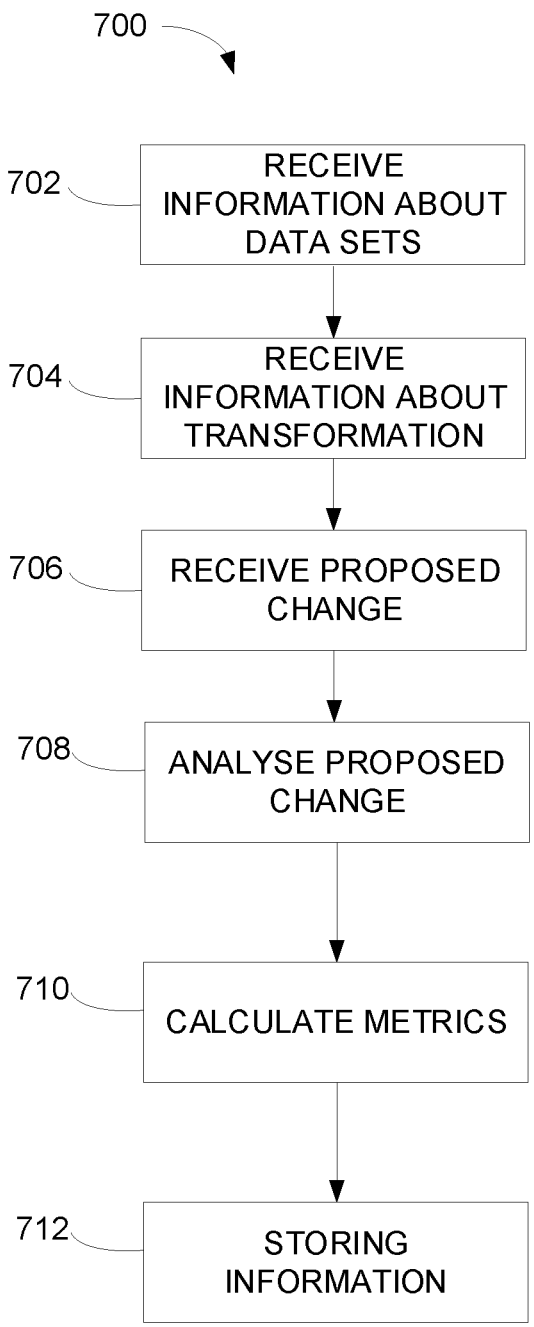
FIG. 7 is a flowchart of an exemplary impact analysis procedure.

FIG. 7 is a flowchart of an exemplary impact analysis procedure 700. The process can be performed by a data processing system, such as the data processing system 600 of FIG. 6.

Information about two logical datasets is received (702). The logical dataset information can identify, for each logical dataset, an identifier for at least one field in that logical dataset, and format information about that field.

Information about a transformation is received (704). The information can identify, from the two logical datasets, a first logical dataset from which the transformation is to receive data and a second logical dataset to which the transformed data is to be provided. The transformation may include information about the rules to be applied to data from the first logical dataset. Analyzing the potential impact of the one or more proposed changes c further based on the one or more rules.

One or more proposed changes is received (706). A proposed change can be a change to a format of a field in a logical dataset, a change to a transformation, or a change to a rule set. In some implementations, the proposed change identifies the field in a logical dataset or the transformation that is to be altered without specifying the nature of the change. For example, the proposed change can specify that field 'X' is to be changed without indicating that the change is from a decimal record format to a string record format.

The proposed change is analyzed (708).

A metric of proposed change is calculated (710). The metric can measure the impact of the change. The metric can include a measure of direct impact and/or a measure of indirect impact. Examples of measures of direct impact include, but are not limited to, locations in a rule set where a changed input parameter is accessed. Examples of measure of indirect impact include, but are not limited to, locations in a rule set where values are set based on a value in a changed input parameter.

The metrics are stored (712). The metrics can be stored in a flat file, a relational database, or in any other persistent data store. The metrics may be stored in the form of a report. The report can be generated identifying the metric of impact. The report can associate the measures of direct impact and the measures of indirect impact with particular portions of the data lineage. For example, the report can indicate that a particular data flow graph, data flow graph field, rule set field, or rule set is associated with a measure of direct impact and a measure of indirect impact.

In some implementations, the report can be tied into the data lineage, for example, through Hyper-Text Transport Protocol (HTTP) links. Selecting or clicking on the link can navigate a browser on a client device to an application or website that allows the user to view a particular portion of the data lineage. For example, referring to FIG. 1, selecting or clicking on the third row 170 can cause a browser or other application on the client device to display the dataflow graph 'Graph 2' 112. In some implementations, that particular graph, graph field, rule set field, and rule set can be visually distinguished, for example, by highlighting.

In some implementations, the report can include an average development and testing cost that can be associated with the proposed change. For example, the report can associate a dollar cost with a direct change and a dollar cost with an indirect change. In some implementations, the dollar cost can be a parameter provided to the process. In other implementations, a default value can be associated with each change. For example, a direct change can be estimated to cost $100 and an indirect change can be determined to cost $25.

The impact analysis approach described above can be implemented using a computing system executing suitable software. For example, the software can include procedures in one or more computer programs that execute on one or more programmed or programmable computing system (which can be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software can include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software can be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing can be performed on a special purpose computer, or using special-purpose hardware, such as coprocessors or field-programmable gate arrays (FPGAs) or dedicated, application-specific integrated circuits (ASICs). The processing can be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system can also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications can be made without departing from the scope of the invention. Additionally, some of the steps described above can be order independent, and thus can be performed in an order different from that described.

What is claimed is:

1. A computer-implemented method for determining an impact to a system, the method including:
    receiving from memory data lineage information for multiple components stored in the system, the multiple components representing at least two logical datasets and a transformation, with the data lineage information identifying a first logical dataset from which the transformation is to receive data and a second logical data dataset to which transformed data is to be provided, the transformation represented by a component in the data lineage information including one or more rules to be applied to data from the first logical dataset, and with the data lineage information identifying paths and flow traces of data though the multiple components;
    receiving from memory data specifying one or more proposed changes to a field in the first logical dataset, a field in the second logical dataset, or the transformation;
    analyzing by a data processing system the multiple components according to the data lineage information;
    based on said analyzing, identifying by the data processing system each component affected by the one or more proposed changes;
    generating by the data processing system an impact metric representing a number of times (i) a field specified by the one or more proposed changes is referenced within at least one identified component, or (ii) a value of a field of at least one identified component is based on a value of a field specified by the one or more proposed changes; and
    storing in memory information about the impact metric.

2. The method of claim 1, wherein the impact metric provides a measure of a direct impact of implementing the one or more proposed changes to the one or more of the multiple components.

3. The method of claim 1, wherein the impact metric provides a measure of an indirect impact of implementing the one or more proposed changes to the one or more of the multiple components.

4. The method of claim 1, further including associating a cost to a proposed change based on one or more impact metrics.

5. The method of claim 1, further including:
    generating a report that provides information on the impact metric.

6. The method of claim 1, further including:
    generating annotated code that includes the impact metric;
    compiling the annotated code into an executable program; and
    at least partially based on execution of the executable program, determining the impact of the one or more proposed changes to one or more of the multiple components.

7. The method of claim 1, further including:
    selecting from data storage stored items of annotated code for one or more of the multiple components in the data lineage information, which are affected by the one or more proposed changes;
    compiling the annotated code of one or more of the stored items into a transform; and
    processing the transform to determine a risk output of a corresponding impact metric.

8. A system, including:
    one or more computers and one or more storage devices storing instructions that are operable, when executed by the one or more computers, to cause the one or more computers to perform operations including:
        receiving from memory data lineage information for multiple components stored in the system, the multiple components representing at least two logical datasets and a transformation, with the data lineage information identifying a first logical dataset from which the transformation is to receive data and a second logical data dataset to which transformed data is to be provided, the transformation represented by a component in the data lineage information including one or more rules to be applied to data from the first logical dataset, and with the data lineage information identifying paths and flow traces of data though the multiple components;
        receiving from memory data specifying one or more proposed changes to a field in the first logical dataset, a field in the second logical dataset, or the transformation;
        analyzing by the one or more computers the multiple components according to the data lineage information;
        based on said analyzing, identifying by the one or more computers each component affected by the one or more proposed changes;
        generating by the one or more computers an impact metric representing a number of times (i) a field specified by the one or more proposed changes is referenced within at least one identified component, or (ii) a value of a field of at least one identified component is based on a value of a field specified by the one or more proposed changes; and
        storing in memory information about the impact metric.

9. The system of claim 8, wherein the impact metric provides a measure of a direct impact of implementing the one or more proposed changes to the one or more of the multiple components.

10. The system of claim 8, wherein the impact metric provides a measure of an indirect impact of implementing the one or more proposed changes to the one or more of the multiple components.

11. The system of claim 8, wherein a proposed change is one of the group consisting of a change in format of a field in a dataset or a change in a transformation.

12. The system of claim 8, wherein the operations further include associating a cost to a proposed change based on one or more impact metrics.

13. The system of claim 8, wherein the operations further include:
    generating a report that provides information on the impact metric.

14. The system of claim 8, wherein the operations further include:
   generating annotated code that includes the impact metric;
   compiling the annotated code into an executable program; and
   at least partially based on execution of the executable program, determining the impact of the one or more proposed changes to one or more of the multiple components.

15. The system of claim 8, wherein the operations further include:
   selecting from data storage stored items of annotated code for one or more of the multiple components in the data lineage information, which are affected by the one or more proposed changes;
   compiling the annotated code of one or more of the stored items into a transform; and
   processing the transform to determine a risk output of a corresponding impact metric.

16. A computer storage medium for determining an impact to a system, the medium encoded with computer program instructions that when executed by a data processing system causes the data processing system to perform operations including:
   receiving from memory data lineage information for multiple components stored in the system, the multiple components representing at least two logical datasets and a transformation, with the data lineage information identifying a first logical dataset from which the transformation is to receive data and a second logical dataset to which transformed data is to be provided, the transformation represented by a component in the data lineage information including one or more rules to be applied to data from the first logical dataset, and with the data lineage information identifying paths and flow traces of data though the multiple components;
   receiving from memory data specifying one or more proposed changes to a field in the first logical dataset, a field in the second logical dataset, or the transformation;
   based on analyzing the multiple components according to the data lineage information, identifying by a data processing system each component that would be affected by the one or more proposed changes;
   generating by the data processing system an impact metric representing a number of times (i) a field specified by the one or more proposed changes is referenced within at least one identified component, or (ii) a value of a field of at least one identified component is based on a value of a field specified by the one or more proposed changes; and
   storing in memory information about the impact metric.

17. The medium of claim 16, where the impact metric provides a measure of a direct impact of implementing the one or more proposed changes to the one or more of the multiple components.

18. The medium of claim 16, where the impact metric provides a measure an indirect impact of implementing the one or more proposed changes to the one or more of the multiple components.

19. The medium of claim 16, wherein a proposed change is one of the group consisting of a change in format of a field in a dataset or a change in a transformation.

20. The medium of claim 16, wherein the operations further include associating a cost to a proposed change based on one or more impact metrics.

21. The medium of claim 16, wherein the operations further include:
   generating a report that provides information on the impact metric.

22. The medium of claim 16, wherein the operations further include:
   generating annotated code that includes the impact metric;
   compiling the annotated code into an executable program; and
   at least partially based on execution of the executable program, determining the impact of the one or more proposed changes to one or more of the multiple components.

23. The medium of claim 16, wherein the operations further include:
   selecting from data storage stored items of annotated code for one or more of the multiple components in the data lineage information, which are affected by the one or more proposed changes;
   compiling the annotated code of one or more of the stored items into a transform; and
   processing the transform to determine a risk output of a corresponding impact metric.

\* \* \* \* \*

UNITED STATES PATENT AND TRADEMARK OFFICE
CERTIFICATE OF CORRECTION

PATENT NO. : 11,475,023 B2
APPLICATION NO. : 16/199985
DATED : October 18, 2022
INVENTOR(S) : Joel Gould and Scott Studer It is certified that error appears in the above-identified patent and that said Letters Patent is hereby corrected as shown below:

In the Claims

Column 11, Line 31 (approx.), Claim 1, delete "though" and insert -- through --

Column 12, Line 31 (approx.), Claim 8, delete "though" and insert -- through --

Column 13, Line 36, Claim 16, delete "though" and insert -- through --

Column 14, Line 13 (approx.), Claim 18, after "measure", insert -- of --

Signed and Sealed this
Twentieth Day of December, 2022

Katherine Kelly Vidal
*Director of the United States Patent and Trademark Office*